Patented Aug. 22, 1933

1,923,622

UNITED STATES PATENT OFFICE 1,923,622

ARTIFICIAL LEATHER MANUFACTURE

Roger B. Hill, Berlin, N. H., assignor to Brown Company, Berlin, N. H., a Corporation of Maine No Drawing. Application January 16, 1929 Serial No. 333,026

2 Claims. (Cl. 91—68)

This invention relates to the manufacture of artificial leather using fiber such as cotton or wood pulp and dispersed rubber such as latex as raw materials.

In the manufacture of artificial leather, it is sometimes the practice to prepare a porous web from cellulose fiber as by felting on a paper machine, and to impregnate the web with rubber as by passing it through a bath of latex. The product, when dried, has many of the desirable characteristics of leather, particularly when the web is in a loosely-felted, more or less fluffy condition, and has absorbed a comparatively large amount of rubber.

I have discovered that in making artificial leather of the type described, it is advantageous to impregnate the web not only with dispersed rubber such as latex but also with tanning agents, preferably of vegetable origin. The tanning agents not only impart color and odor characteristic of vegetable-tanned hides and skins to the product, substantially removing the characteristic rubber odor, but also modify the characteristics of the latex so that an improvement in quality of product is realized. Thus, if such agents are added to the latex before impregnating the web, it is found that the dried product is less tacky and more uniformly impregnated with rubber than when the tanning agent is omitted. The tanning agent serves to hasten coagulation or setting of the rubber in situ in the web, and thus to avoid migration of the rubber globules by capillarity to the surface of the web while evaporation of water is taking place. The tanning agent apparently also combines with the protein films on the rubber globules, as it combines with the protein substance of hides and skins, rendering them insoluble and lessening the tackiness of the rubber coagulated in the web. Or the web may be impregnated with latex alone and then with a solution of tanning extract, in which case it is preferable to dry the latex-impregnated web before impregnation with extract solution, as well as after impregnation, as drying coagulates the rubber so that loss of rubber by washing out in the extract solution is avoided. The dry latex-impregnated web, when treated with extract solution, loses tackiness, and is sufficiently porous to be colored and to derive other beneficent qualities imparted by the solution.

In carrying out the process of the present invention, I may employ a porous web, paper, or felt of preferably cellulose fiber of any suitable origin. Preferably, the web is in a loosely-felted, more or less fluffy condition, so that when dipped into a bath of latex it is rapidly and uniformly penetrated, and absorbs, say, 100% or more rubber, based on the dry weight of fiber. A latex of about 30% solids content and containing about 3% by weight of NH3 as a stabilizer may be prepared for use by diluting to a solids content of, say, about 15%, at which content rapid and uniform penetration of the web may be effected by dipping to produce a final product having the desired rubber content. To the latex or the diluting water may be added about 1% of a tanning agent or mixture of agents (based on the weight of the diluted latex) of suitable, preferably vegetable, origin, as agents of such origin possess coloring properties and act to remove the characteristic rubber odor, e. g., oak extract, chestnut extract, quebracho extract, or the like, according to the color desired. These extracts as available on the market may have an active tannin content of about 65%, but coagulation of the rubber in the latex by the tannin is prevented by the ammonia. After impregnation of the web with the latex has been effected, the web is subjected to drying, during which operation the ammonia and water are volatilized so that the coagulation of the rubber is effected. If desired, two or more webs may be treated while in superposed relation as described, in which case good bonding between the plies is obtained by reason of the fact that migration of the rubber globules during drying from the interior of the webs to the surface is avoided. If desired, in lieu of adding the extract to the latex, the web may first be dipped into the latex and then into a bath of water, preferably hot, containing about 1% of the extract. Inasmuch as rubber would be lost by washing out in the extract solution if the latex-impregnated web were not dried, drying of the web is preferably effected before immersion in the hot tanning liquor, whereupon the tanned web may again be dried.

Evaporated waste sulphite liquor may be used in lieu of a portion of the vegetable extract in cases where it is desired to produce light-colored products, as such liquor contains active tanning substance and fillers.

One of the major advantages of a process such as described is that it permits the economical production of artificial leathers having colors resembling vegetable-tanned natural leathers or skins, as vegetable tanning agents are inexpensive as compared with dyes such as diamine fast brown, and but little agent is necessary to effect the desired coloration.

It should be evident to those skilled in the art that the foregoing example is illustrative only, and that various changes and modifications might be made therein without departing from the spirit or scope of invention as defined in the appended claims.

I claim:

1. A process which comprises impregnating a web of fibers with latex containing a vegetable tanning agent and concentrated waste sulphite liquor.

2. An artificial leather comprising a web of fibers impregnated with rubber, and a tanning agent containing concentrated waste sulphite liquor.

ROGER B. HILL.